(12) United States Patent
Carson et al.

(10) Patent No.: US 11,702,215 B2
(45) Date of Patent: Jul. 18, 2023

(54) INTEGRALLY SAFE QUICK RELEASE LATCH-KEEPER

(71) Applicant: AMI INDUSTRIES, INC., Colorado Springs, CO (US)

(72) Inventors: Kassidy L. Carson, Colorado Springs, CO (US); John Hampton, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 17/503,029

(22) Filed: Oct. 15, 2021

(65) Prior Publication Data

US 2023/0123304 A1     Apr. 20, 2023

(51) Int. Cl.
| | |
|---|---|
| *B64D 25/10* | (2006.01) |
| *B64D 11/06* | (2006.01) |
| *B64D 25/04* | (2006.01) |
| *E05C 3/30* | (2006.01) |
| *B60R 22/32* | (2006.01) |

(52) U.S. Cl.
CPC .......... *B64D 25/10* (2013.01); *B64D 11/0689* (2013.01); *B64D 25/04* (2013.01); *E05C 3/30* (2013.01); *B60R 22/322* (2013.01)

(58) Field of Classification Search
CPC ... B64D 25/10; E05C 3/00; E05C 3/12; E05C 3/124; E05C 3/14; E05C 3/145; E05C 3/16; E05C 3/167; E05C 3/22; E05C 3/30
See application file for complete search history.

(56) References Cited

U.S. PATENT DOCUMENTS

| | | | | |
|---|---|---|---|---|
| 1,133,254 | A | * | 3/1915 | Backus ..................... E05C 3/30 |
| | | | | 292/254 |
| 7,878,452 | B2 | | 2/2011 | Mastrolia |
| 8,191,830 | B2 | | 6/2012 | Mastrolia |
| 10,252,803 | B2 | | 4/2019 | Muirhead |
| 10,807,501 | B2 | | 10/2020 | Gross |
| 2020/0024878 | A1 | * | 1/2020 | Kim ..................... F25D 29/006 |
| 2022/0357046 | A1 | * | 11/2022 | Moore ..................... E05C 3/30 |

* cited by examiner

*Primary Examiner* — Richard G Davis
(74) *Attorney, Agent, or Firm* — Snell & Wilmer L.L.C (57) ABSTRACT

A latch assembly may comprise a keeper and a lever. The keeper may include a keeper channel defined at least partially by a first channel surface and a second channel surface. The lever may be configured to rotate relative to the keeper and between an engaged state and a released state. The lever may comprise a shaft and a lever protrusion extending from the shaft. The lever protrusion may be defined at least partially by a proximal surface and a distal surface. The keeper channel may be configured to receive the lever protrusion. In the engaged state, the proximal surface of the lever may contact the second channel surface of the keeper and the first channel surface of the keeper may be spaced apart from the lever protrusion.

19 Claims, 6 Drawing Sheets

INTEGRALLY SAFE QUICK RELEASE LATCH-KEEPER

FIELD

The present disclosure relates a latch-keeper, and more specifically to an integrally safe quick release latch-keeper in communication with a passive head and neck protection system.

BACKGROUND

Ejection seats are designed to eject pilots from an aircraft. Various components of the ejection seat may be configured to deploy in response to initiation of the ejection sequence and/or in response to other ejection events (e.g., translation of the ejection seat out of the cockpit, separation of the seat occupant from the seat, etc.). These components may be secured in the stowed position by a latch assembly. The latch assembly may be a stored energy device, such as, for example, a spring-loaded latch assembly. In this regard, upon release of the latch assembly, the component translates (e.g., rotates) to a deployed position.

Current stored energy latch assemblies often include a catch (or pawl) and a keeper. The keeper may be restrained by interfacing with the catch. Depending on the size or location of the latch assembly and the envelope available to package the latch assembly, it may be difficult to guard or otherwise protect the latch assembly from being inadvertently released, while also allowing for access to manually release the latch assembly and deploy the component, for example, during testing. In this regard, quick and easy deployment of the latch assembly is desirable for functional checks during acceptance testing or demonstrations, but prevention of inadvertent deployment is needed to decrease chances for injury.

SUMMARY

A latch assembly is disclosed herein. In accordance with various embodiments, the latch assembly may comprise a keeper and lever. The keeper includes a keeper channel defined at least partially by a first channel surface and a second channel surface. The lever is configured to rotate relative to the keeper. The lever is configured to rotate between an engaged state and a released state. The lever comprises a shaft and a lever protrusion extending from the shaft. The lever protrusion is defined at least partially by a proximal surface and a distal surface. The keeper channel is configured to receive the lever protrusion. In the engaged state, the proximal surface of the lever protrusion contacts the second channel surface of the keeper. In the engaged state, the first channel surface of the keeper is spaced apart from the lever protrusion.

In various embodiments, the keeper further comprises an exterior surface oriented away from the keeper channel, an upper surface extending between the exterior surface and the first channel surface, and a recessed surface defining a floor of the keeper channel. The second channel surface of the keeper channel extends perpendicularly from the recessed surface.

In various embodiments, the first channel surface is oriented at a non-perpendicular relative to the upper surface. In various embodiments, the first channel surface is oriented at an angle of between 15° and 60° relative to a plane parallel with the upper surface.

In various embodiments, in the engaged state, the distal surface of the lever protrusion and the first channel surface of the keeper define a gap. The gap is configured to receive a tool having a shape complementary to the gap.

In various embodiments, the lever rotates about an axis, and a first distance between the axis and a distal end of the of the lever is less than a second distance between the axis and the exterior surface of the keeper.

In various embodiments, in the engaged state, an upper shaft surface of the lever is at least one of coplanar with the upper surface of the keeper or located between the recessed surface and a plane parallel to the upper surface of the keeper.

An ejection seat is also disclosed herein. In accordance with various embodiments, the ejection seat may comprise a seatback, a passive head and neck protection system including a strut support configured to pivot relative to the seatback, and a latch assembly coupled to the passive head and neck protection system. The latch assembly is configured to rotate between an engaged state and a released state. In the engaged state, the latch assembly prevents the strut support from pivoting away from the seatback. The latch assembly may comprise a keeper and lever. The keeper includes a keeper channel defined at least partially by a first channel surface and a second channel surface. The lever is configured to rotate relative to the keeper. The lever is configured to rotate between an engaged state and a released state. The lever comprises a shaft and a lever protrusion extending from the shaft. The lever protrusion is defined at least partially by a proximal surface and a distal surface. The keeper channel is configured to receive the lever protrusion. In the engaged state, the proximal surface of the lever protrusion contacts the second channel surface of the keeper. In the engaged state, the first channel surface of the keeper is spaced apart from the lever protrusion.

In various embodiments, the keeper is coupled to the strut support, and the lever is rotationally coupled to the seatback. In various embodiments, the keeper further comprises an exterior surface oriented away from the keeper channel, an upper surface extending between the exterior surface and the first channel surface, and a recessed surface defining a shaft portion of the keeper channel. The second channel surface of the keeper channel extends perpendicularly from the recessed surface.

In various embodiments, the first channel surface is oriented at a non-perpendicular relative to the upper surface. In various embodiments, the first channel surface is oriented at an angle of between 15° and 60° relative to a plane coplanar with the upper surface.

In various embodiments, in the engaged state, the distal surface of the lever protrusion and the first channel surface of the keeper define a gap. In various embodiments, the lever rotates about an axis, and a first distance between the axis and a distal end of the of the lever is less than a second distance between the axis and the exterior surface of the keeper.

In various embodiments, in the engaged state, an upper shaft surface of the lever is at least one of coplanar with the upper surface of the keeper or located between the recessed surface and a plane parallel to the upper surface of the keeper.

In accordance with various embodiments, an ejection seat may comprise a first structure, a biased component configured to pivot relative to the first structure, and a latch assembly coupled to the biased component. The latch assembly is configured to rotate between an engaged state and a released state. In the engaged state, the latch assembly prevents the biased component from translating relative to the first structure. The latch assembly comprises a keeper and a lever. The keeper includes a keeper channel defined at least partially by a first channel surface and a second channel surface. The lever is configured to rotate relative to the keeper and includes a shaft and a lever protrusion extending from the shaft. The lever protrusion is defined at least partially by a proximal surface and a distal surface. The keeper channel is configured to receive the lever protrusion. In the engaged state, the proximal surface of the lever protrusion contacts the second channel surface of the keeper. In the engaged state, the first channel surface of the keeper is spaced apart from the lever protrusion.

In various embodiments, the keeper is coupled to the biased component, and the lever is rotationally coupled to the first structure. In various embodiments, the keeper further comprises an exterior surface oriented away from the keeper channel, an upper surface extending between the exterior surface and the first channel surface, and a recessed surface defining a shaft portion of the keeper channel. The second channel surface of the keeper channel extends perpendicularly from the recessed surface.

In various embodiments, the lever rotates about an axis, and a first distance between the axis and a distal end of the of the lever is less than a second distance between the axis and the exterior surface of the keeper.

In various embodiments, in the engaged state, an upper shaft surface of the lever is at least one of coplanar with the upper surface of the keeper or located between the recessed surface and a plane parallel to the upper surface of the keeper.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact.

Disclosed herein is a latch assembly. In accordance with various embodiments, the latch assembly includes a lever and a keeper. The keeper defines a channel and is configured to engage the lever. In various embodiments, a force, or biasing load, is applied to keeper the (e.g., the keeper is spring-loaded). In an "engaged state," the lever engages the keeper and thereby restrains, or otherwise prevents, the force from translating (e.g., rotating) the keeper. The lever may be rotated, or otherwise translated, to a "released state." In the released state, the lever no longer contacts and/or engages the keeper. Removing the interference created by the lever (i.e., removing the contact/engagement between the lever and the keeper), allows the force to translate (e.g., rotate) the keeper.

Figure 1:
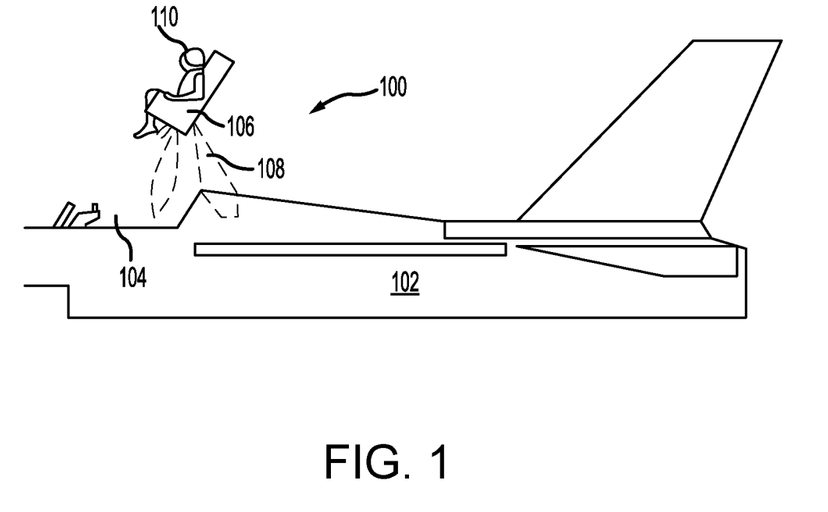
FIG. 1 illustrates an ejection seat being launched from an aircraft cockpit, in accordance with various embodiments.

In various embodiments, and with reference to FIG. 1, an aircraft ejection system 100 is shown, in accordance with various embodiments. Aircraft ejection system 100 may be installed in aircraft 102 to safely expel ejection seat 106 and an occupant 110 of ejection seat 106 from a cockpit 104 of aircraft 102. Ejection seat 106 may be urged from cockpit 104 by a propulsion system 108. For example, upon receipt of an eject signal (e.g., an ejection signal initiated by pilot command or by an aircraft computer), propulsion system 108 is initiated to accelerate ejection seat 106 and occupant 110 out aircraft 102.

Figure 2A:
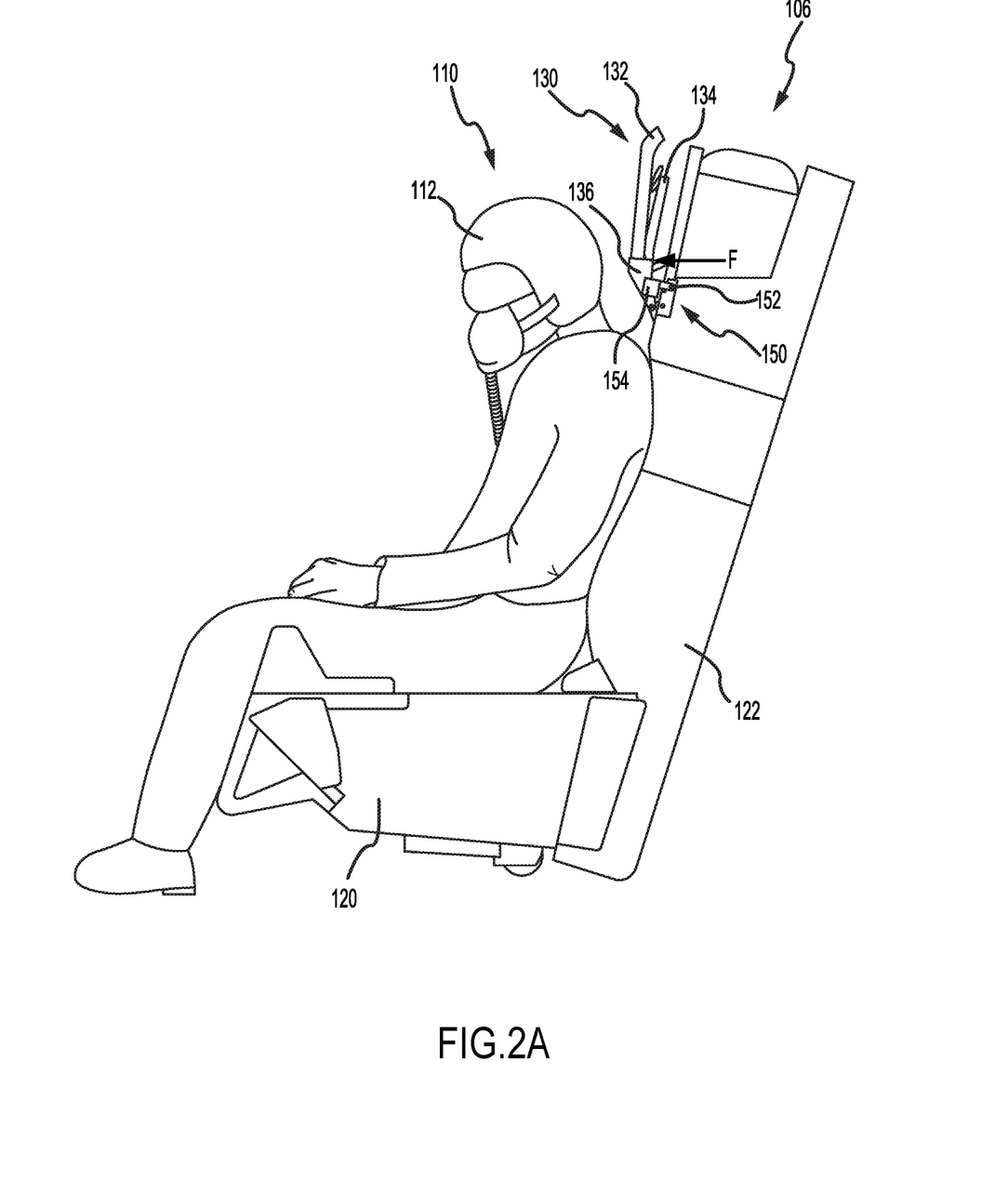
FIG. 2A illustrates an ejection seat having a passive head and neck protection system retained in a non-deployed position by a latch assembly, in accordance with various embodiments.
Figure 2B:
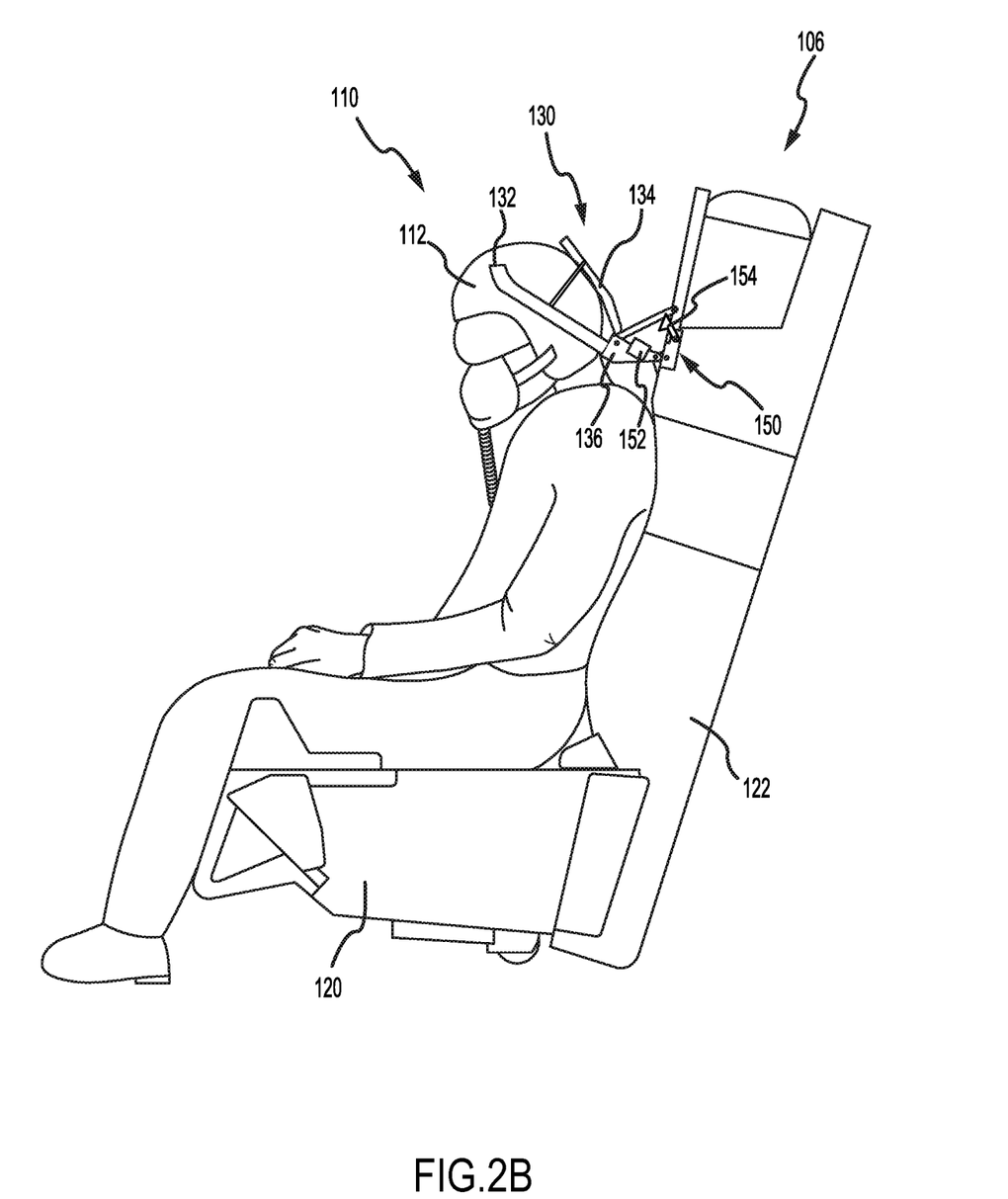
FIG. 2B illustrates the ejection seat of FIG. 2A with the latch assembly in a released state and the passive head and neck protection system in a deployed position, in accordance with various embodiments.

With reference to FIGS. 2A and 2B, ejection seat 106 is illustrated, in accordance with various embodiments. Ejection seat 106 includes a seat bucket 120 and a seatback 122. In various embodiments, ejection seat 106 may include a passive head and neck protection system 130. Passive head and neck protection system 130 may deploy in response to initiation of the ejection sequence. Passive head and neck protection system 130 deploys from a stowed position, shown in FIG. 2A, to a deployed position, shown in FIG. 2B. In the deployed position, passive head and neck protection system 130 restricts rearward and side-to-side movement of the head and helmet 112 of occupant 110.

In various embodiments, passive head and neck protection system 130 may comprise a pair of side supports 132 (one shown) and a rear support 134. Side supports 132 and rear support 134 are pivotably attached to seatback 122. Upon receipt of an eject signal, side supports 132 and rear support 134 pivot forward (i.e., away from seatback 122 and toward head 112). In the deployed position, the side supports 132 are located over opposing sides (i.e., the left and right sides) of head 112 and restrict side-to-side movement of head 112. In the deployed position, rear support 134 may contact a rearward portion of head 112 and restrict rearward movement of head 112. Each of the side supports 132 may be attached to a strut support 136. Strut support 136 is pivotably attached to seatback 122.

In accordance with various embodiments, a latch assembly 150 is operably coupled to passive head and neck protection system 130. Latch assembly 150 may be configured to restrain, or otherwise prevent, passive head and neck protection system 130 from deploying, prior to initiation of an ejection sequence. In response to initiation of the ejection sequence, latch assembly 150 may rotate from an engaged state, as shown in FIG. 2A to a released state, as shown in FIG. 2B. In the engaged state, a lever 152 of latch assembly 150 engages a keeper 154 of latch assembly 150, thereby preventing passive head and neck protection system 130 from deploying. For example, in various embodiments, keeper 154 may be coupled to strut support 136. A force F may be applied to strut support 136 by a biasing member (e.g., a torsion spring). Force F is configured to cause strut support 136 and side supports 132 to pivot away from seatback 122. While force F is illustrated with a straight vector, it is contemplated and understood that force F may be a rotation force (e.g., force applied in a rotational direction) or applied such that translation and rotation simultaneously occur (e.g., complex motion). In the engaged state, lever 152 contacts keeper 154 and generates an interference between lever 152 contacts keeper 154, thereby preventing force F from pivoting strut support 136, which is coupled to keeper 154, away from seatback 122. In response to initiation of the ejection sequence, lever 152 rotates out of contact with keeper 154, thereby removing the interference between lever 152 and keeper 154. In response to the interference between lever 152 and keeper 154 being removed, force F causes strut support 136 and side supports 132, which are coupled to strut support 136, to pivot to the deployed position.

As described in further detail below, latch assembly 150 may be configured to prevent and/or reduce occurrences of latch assembly 150 being inadvertently translated (e.g., rotated) to the released stated, while still allowing latch assembly 150 to be readily accessible for manual release during, for example, functional checks and/or acceptance testing and/or ejection seat demonstrations.

Figure 3A:
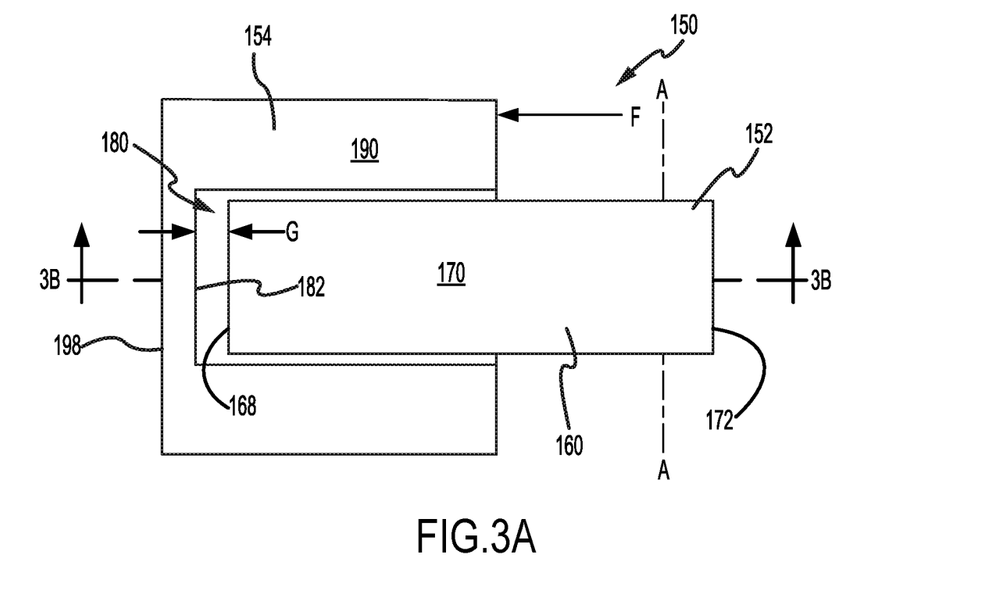
FIGS. 3A and 3B illustrate a top view and a cross-section view, respectively, of a latch assembly in an engaged state, in accordance with various embodiments.
Figure 3B:
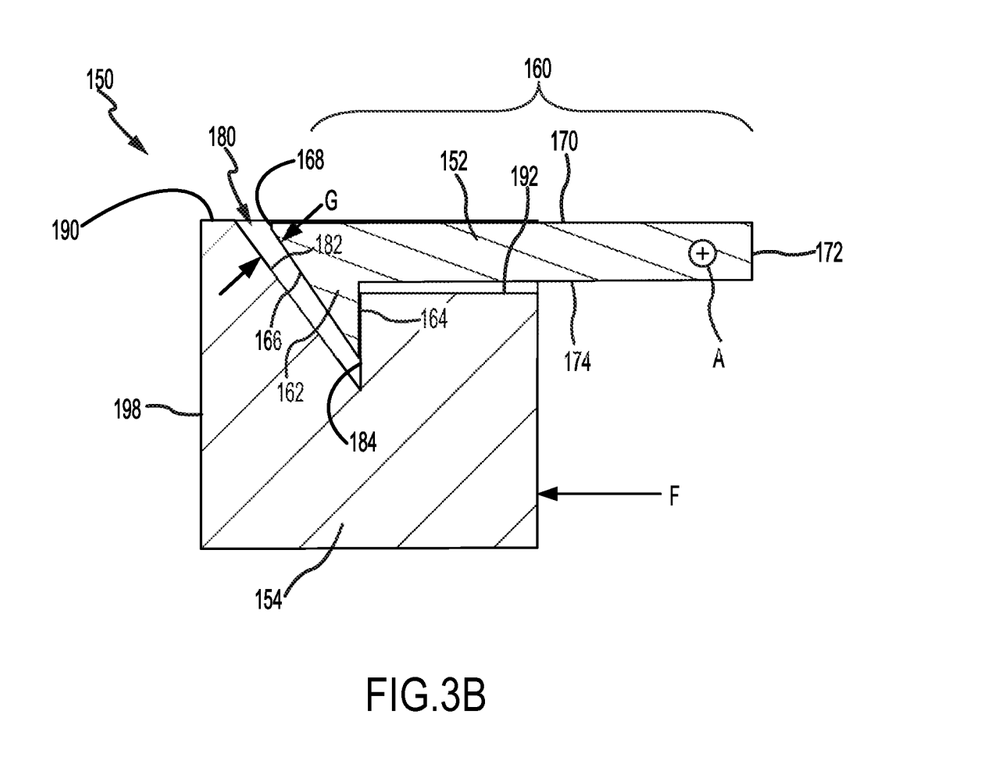

With additional reference to FIGS. 3A and 3B, latch assembly 150 is illustrated in the engaged state. FIG. 3A illustrates a top-down view of latch assembly. FIG. 3B illustrates a cross-section view of latch assembly 150, taken along the line 3B-3B in FIG. 3A.

Figure 4:
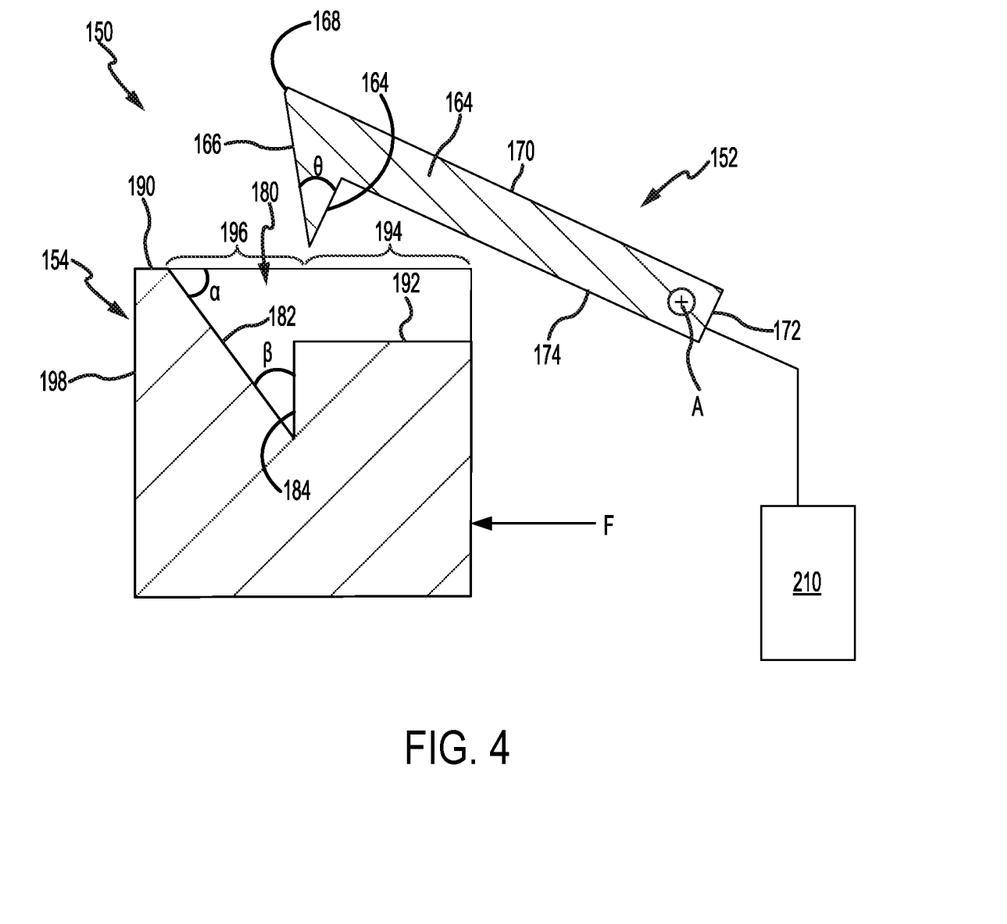
FIG. 4 illustrates a cross-section view of a latch assembly in a released state, in accordance with various embodiments.

Latch assembly 150 includes lever 152 and keeper 154. Lever includes a shaft 160 and a lever protrusion 162 extending from shaft 160. Lever 152 is configured to rotate about axis of rotation A. In various embodiments, lever 152 may be rotationally coupled to seatback 122. In this regard, lever 152 may rotate relative to seatback 122 and/or to keeper 154. In various embodiments, initiation of the ejection sequence or other ejection sequence event (e.g., ejection seat 106 translating a threshold distance) may cause lever 152 to rotate from the engage state (FIG. 3B) to the released state (FIG. 4).

Lever includes a shaft 160 and a lever protrusion 162 extending from shaft 160. Lever protrusion 162 may be defined by a proximal surface 164 and a distal surface 166. As used here, the term "distal" refers to a direction away from axis A, and the term "proximal" refers to a direction toward axis A. In this regard, distal surface 166 is located a greater distance from axis A as compared to proximal surface 164. Distal surface 166 is oriented generally away from axis A. Proximal surface 164 is oriented generally toward axis A. Distal surface 166 extends to a distal (or first) end 168 of lever 152. Distal end 168 may be the point on lever 152 that is the greatest distance from axis A. An upper shaft surface 170 of lever 152 (also referred to an upper shaft surface) extends from distal end 168 to proximal (or second) end 172 of lever 152. Proximal end 172 is opposite of distal end 168. Proximal surface 164 of lever 152 may extend from distal surface 166 to an underside surface 174 of lever 152 (also referred to an underside shaft surface). In various embodiments, proximal surface 164 may extend approximately perpendicularly from underside shaft surface 174. As used in the previous context only, "approximately" means±10°.

In accordance with various embodiments, lever 152 and lever protrusion 162 are configured to be received by a keeper channel 180 defined by keeper 154. Lever 152 is configured to translate/rotate along (e.g., into and out of) keeper channel 180. In various embodiments, keeper channel 180 is defined, at least partially, by a first (or distal) channel surface 182 and a second (or proximal) channel surface 184 of keeper 154. In various embodiments, the angle and/or shape of the portion of keeper channel 180 formed by first channel surface 182 and second channel surface 184 is configured to complement the angle and/or shape of lever protrusion 162. For example, and with momentary reference to FIG. 4, distal surface 166 of lever protrusion 162 may be oriented at an angle theta (θ) relative to proximal surface 164, and first channel surface 182 may be oriented at an angle beta (β) relative to second channel surface 184. Angle theta may be approximately equal to angle beta. As used in the previous context only, "approximately" means±5°. Returning to FIG. 3B, in this regard, when latch assembly 150 is in the engaged state, distal surface 166 may be approximately parallel to first channel surface 182. Stated differently, when proximal surface 164 is contacting second channel surface 184, distal surface 166 may be approximately parallel to first channel surface 182. As used in the previous context only, "approximately parallel" means±5° from parallel.

In the engaged state, proximal surface 164 contacts second channel surface 184, thereby generating an interference between the lever 152 and keeper 154. Keeper 154 may be subjected to a force F. Force F may be applied directly to keeper 154 or through a secondary component. For example, and with momentary reference to FIG. 2A, force F may be applied to strut support 136, and transferred to keeper 154 via keeper 154 being attached to strut support 136. Returning to FIG. 3B, the interference between the lever 152 and keeper 154 prevents keeper 154 from translating and/or rotating in the direction of force F.

Figure 5:
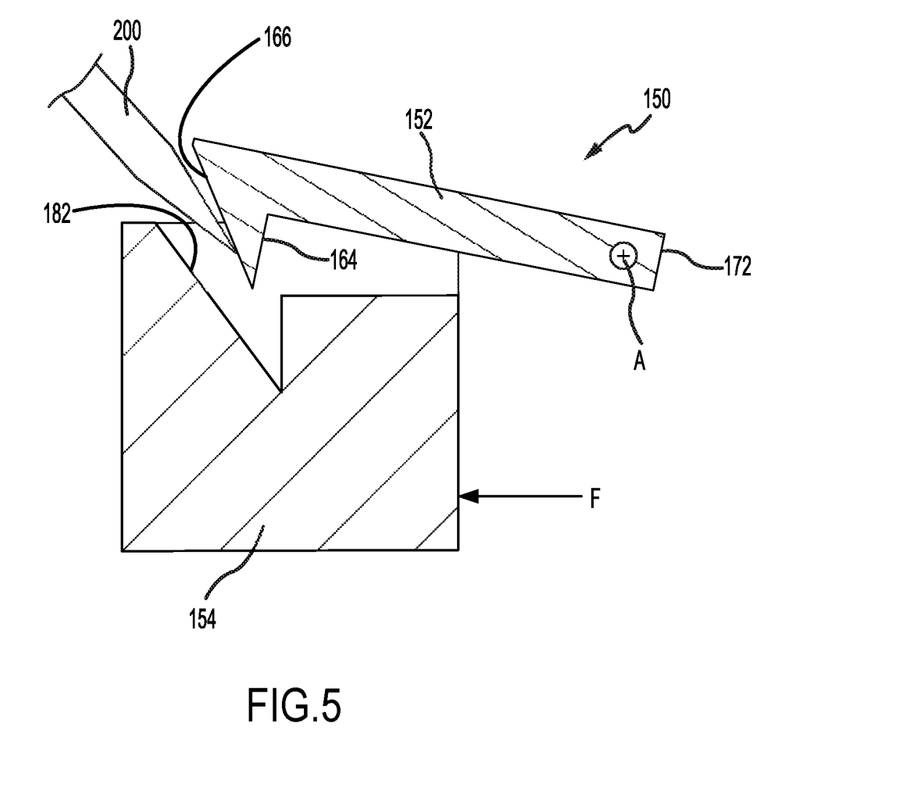
FIG. 5 illustrates a cross-section view of a latch assembly being manually rotated to the released state by a tool, in accordance with various embodiments.

In the engaged state, distal end 168 and distal surface 166 of lever 152 are spaced apart from first channel surface 182. In this regard, in the engaged state, distal surface 166 and first channel surface 182 define a gap G. Gap G may facilitate manual translation (e.g., rotation) of lever 152 (and thus manual deployment of passive head and neck protection system 130 in FIGS. 2A and 2B). For example, and with reference to FIG. 5, gap G may allow a tool 200 to be inserted into keeper channel 180, between distal surface 166 of lever protrusion 162 and first channel surface 182. Tool 200 may have a shape complementary to the gap G. Tool 200 is configured to be inserted into gap G and to displace the lever 152. In this regard, tool 200 may be employed to manually cause lever 152 to rotate about axis A and out of keeper channel 180. Tool 200 may include a double incline plane or any other shaped key (e.g., complex curvatures) that is complementary to gap G (i.e., a key having a shape that is complementary to the shape of a gap defined by distal surface 166 and first channel surface 182).

Returning to FIG. 3B, in the engaged state, lever 152 may be generally surrounded by keeper 154. In particular, upper shaft surface 170 of lever 152 may be coplanar with or located below an upper surface 190 of keeper 154. As used in the previous context, "below" means that upper shaft surface 170 is located between a plane coplanar with upper surface 190 and a recessed surface 192 of keeper channel 180. Recessed surface 192 may form a shaft portion 194 (FIG. 4) of keeper channel 180. In the engaged state, at least a portion of shaft 160 of lever 152 is located in shaft portion 194 of keeper channel 180. A protrusion portion 196 (FIG. 4) of keeper channel 180 may be defined by first channel surface 182 and second channel surface 184. Protrusion portion 196 may be distal to shaft portion 194 (e.g., protrusion portion 196 is located a greater distance from axis A, as compared to shaft portion 194). Second channel surface 184 may extend perpendicularly from recessed surface 192. In various embodiments, first channel surface 182 may be oriented at a non-perpendicular angle relative to a plane that is coplanar with upper surface 190. For example, and with momentary reference to FIG. 4, first channel surface 182 may be oriented at an angle alpha (α) relative to a plane coplanar with upper surface 190. Angle alpha may be between 10° and 70°, between 15° and 60°, between 20° and 45°, or any other suitable angle.

Returning to FIG. 3B, keeper channel 180 is formed in upper surface 190 of keeper 154. Upper surface 190 extends between first channel surface 182 and an exterior surface 198 of keeper 154. Exterior surface 198 is oriented away from keeper channel 180. Exterior surface 198 of keeper 154 is distal to distal end 168 of lever 152. In this regard, exterior surface 198 of keeper 154 is located a greater distance from axis A as compared to distal end 168 of lever 152. Lever 152 being generally surrounded by keeper 154, in the engaged state, tends to reduce a probability that lever 152 may be unintentionally actuated. In other words, keeper 154 generally blocks or otherwise prevents contact with lever 152, when latch assembly 150 is in the engaged state.

With reference to FIG. 4, latch assembly 150 is illustrated in the released state. In accordance with various embodiments, latch assembly 150 is configured to rotate to the released state, in response to initiation of an ejection sequence. For example, latch assembly 150 may rotate to the released state, in response to an ejection handle being actuation and/or in response to ejection seat 106 (FIG. 1) beginning to translate away from a floor of cockpit 104. In various embodiments, an actuator 210 (shown schematically) may be coupled to lever 152. Actuator 210 may cause lever 152 to rotate about axis A, in response to initiation of the ejection sequence. In this regard, actuation of actuator 210 causes lever 150 to rotate out of keeper channel 180. Rotation of lever 152 out of keeper channel 180 removes the interference between lever 152 and keeper 154 (e.g., between proximal surface 164 of lever 150 and second channel surface 184 of keeper 154). In response to removal of the interference between lever 152 and keeper 154, force F causes translation (e.g., rotation) of keeper 154. In various embodiments, strut support 136 (FIG. 2B) pivots away from seatback 122 in response to removal of the interference between lever 152 and keeper 154. Stated differently, passive head and neck protection system 130 (FIG. 2B) may deploy in response to latch assembly 150 rotating to the released state.

While latch assembly 150 is described as being implemented with passive head and neck protection system 130 and strut support 136, the present disclosure is not necessarily so limited. In this regard, latch assembly 150 may be adapted for use in other ejection seat components and/or for use in a variety of other industries. As such, numerous applications of the present disclosure may be realized.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A latch assembly, comprising:
   a keeper including a keeper channel, the keeper channel being defined at least partially by a first channel surface and a second channel surface; and
   a lever configured to rotate relative to the keeper, the lever being configured to rotate between an engaged state and a released state, wherein the lever comprises a shaft and a lever protrusion extending from the shaft, the lever protrusion being defined at least partially by a proximal surface and a distal surface,
   wherein the keeper channel is configured to receive the lever protrusion,
   wherein in the engaged state the proximal surface of the lever protrusion contacts the second channel surface of the keeper, and
   wherein in the engaged state the first channel surface of the keeper is spaced apart from the distal surface of the lever protrusion defining a gap, the gap being configured to receive a tool having a shape complementary to the gap.

2. The latch assembly of claim 1, wherein the keeper further comprises:
   an exterior surface oriented away from the keeper channel;
   an upper surface extending between the exterior surface and the first channel surface; and
   a recessed surface defining a floor of the keeper channel, wherein the second channel surface of the keeper channel extends perpendicularly from the recessed surface.

3. The latch assembly of claim 2, wherein the first channel surface is oriented at a non-perpendicular relative to the upper surface.

4. The latch assembly of claim 3, wherein the first channel surface is oriented at an angle of between 15° and 60° relative to a plane parallel with the upper surface.

5. The latch assembly of claim 2, wherein the lever rotates about an axis, and wherein a first distance between the axis and a distal end of the of the lever is less than a second distance between the axis and the exterior surface of the keeper.

6. The latch assembly of claim 5, wherein in the engaged state an upper shaft surface of the lever is at least one of coplanar with the upper surface of the keeper or located between the recessed surface and a plane parallel to the upper surface of the keeper.

7. An ejection seat, comprising:
   a seatback;
   a passive head and neck protection system including a strut support configured to pivot relative to the seatback; and
   a latch assembly coupled to the passive head and neck protection system, the latch assembly being configured to rotate between an engaged state and a released state, wherein in the engaged state the latch assembly prevents the strut support from pivoting away from the seatback, the latch assembly comprising:
      a keeper including a keeper channel, the keeper channel being defined at least partially by a first channel surface and a second channel surface; and
      a lever configured to rotate relative to the keeper, the lever including a shaft and a lever protrusion extending from the shaft, the lever protrusion being defined at least partially by a proximal surface and a distal surface,
   wherein the keeper channel is configured to receive the lever protrusion,
   wherein in the engaged state the proximal surface of the lever protrusion contacts the second channel surface of the keeper, and
   wherein in the engaged state the first channel surface of the keeper is spaced apart from the lever protrusion.

8. The ejection seat of claim 7, wherein the keeper is coupled to the strut support, and wherein the lever is rotationally coupled to the seatback.

9. The ejection seat of claim 7, wherein the keeper further comprises:
   an exterior surface oriented away from the keeper channel;
   an upper surface extending between the exterior surface and the first channel surface; and
   a recessed surface defining a shaft portion of the keeper channel, wherein the second channel surface of the keeper channel extends perpendicularly from the recessed surface.

10. The ejection seat of claim 9, wherein the first channel surface is oriented at a non-perpendicular relative to the upper surface.

11. The ejection seat of claim 9, wherein the first channel surface is oriented at an angle of between 15° and 60° relative to a plane coplanar with the upper surface.

12. The ejection seat of claim 9, wherein in the engaged state the distal surface of the lever protrusion and the first channel surface of the keeper define a gap.

13. The ejection seat of claim 12, wherein the lever rotates about an axis, and wherein a first distance between the axis and a distal end of the of the lever is less than a second distance between the axis and the exterior surface of the keeper.

14. The ejection seat of claim 13, wherein in the engaged state an upper shaft surface of the lever is at least one of coplanar with the upper surface of the keeper or located between the recessed surface and a plane parallel to the upper surface of the keeper.

15. An ejection seat, comprising:
   a first structure;
   a biased component configured to pivot relative to the first structure; and
   a latch assembly coupled to the biased component, the latch assembly being configured to rotate between an engaged state and a released state, wherein in the engaged state the latch assembly prevents the biased component from translating relative to the first structure, the latch assembly comprising:
      a keeper including a keeper channel, the keeper channel being defined at least partially by a first channel surface and a second channel surface; and
      a lever configured to rotate relative to the keeper, the lever including a shaft and a lever protrusion extending from the shaft, the lever protrusion being defined at least partially by a proximal surface and a distal surface,
   wherein the keeper channel is configured to receive the lever protrusion,
   wherein in the engaged state the proximal surface of the lever protrusion contacts the second channel surface of the keeper, and
   wherein in the engaged state the first channel surface of the keeper is spaced apart from the lever protrusion.

16. The ejection seat of claim 15, wherein the keeper is coupled to the biased component, and wherein the lever is rotationally coupled to the first structure.

17. The ejection seat of claim 16, wherein the keeper further comprises:
- an exterior surface oriented away from the keeper channel;
- an upper surface extending between the exterior surface and the first channel surface; and
- a recessed surface defining a shaft portion of the keeper channel, wherein the second channel surface of the keeper channel extends perpendicularly from the recessed surface.

18. The ejection seat of claim 17, wherein the lever rotates about an axis, and wherein a first distance between the axis and a distal end of the of the lever is less than a second distance between the axis and the exterior surface of the keeper.

19. The ejection seat of claim 18, wherein in the engaged state an upper shaft surface of the lever is at least one of coplanar with the upper surface of the keeper or located between the recessed surface and a plane parallel to the upper surface of the keeper.

\* \* \* \* \*